United States Patent Office 2,803,041
Patented Aug. 20, 1957

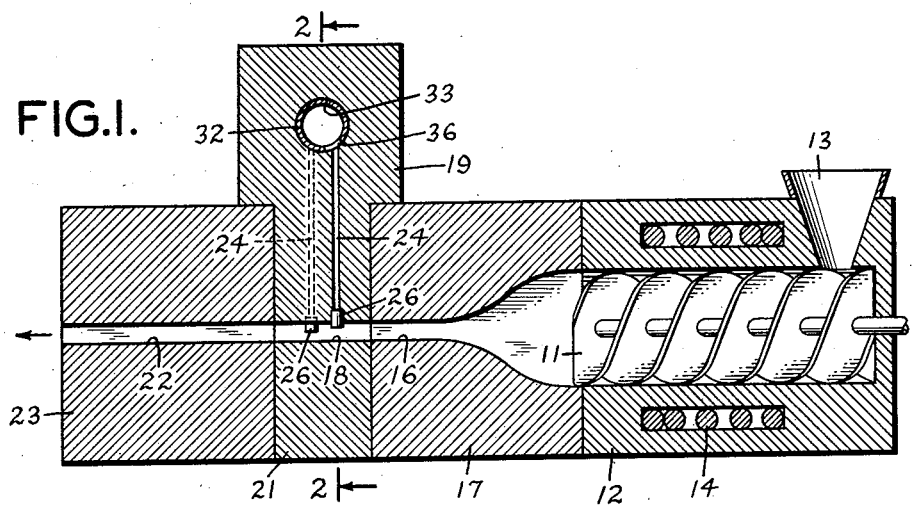
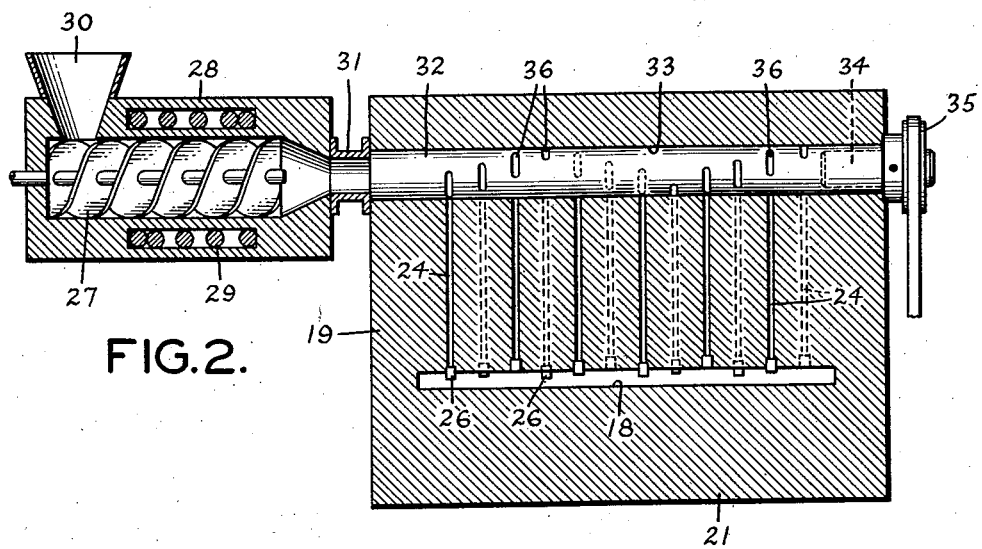
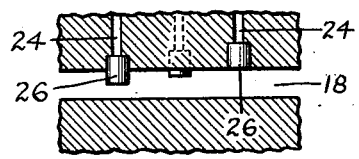
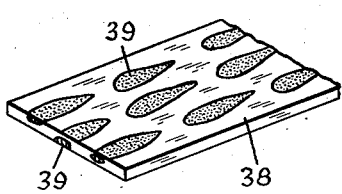
INVENTORS.
JOHN HILL
ARPAD P. BERGER

2,803,041

EXTRUSION OF PLASTIC MATERIALS

John Hill, Union, N. J., and Arpad P. Berger, Jackson Heights, N. Y., assignors to Celanese Corporation of America, New York, N. Y., a corporation of Delaware Application February 11, 1953, Serial No. 336,358

13 Claims. (Cl. 18—12)

This invention relates to the extrusion of thermoplastic materials and relates more particularly to the production of ornamental extruded thermoplastic materials.

It is an object of this invention to provide a novel ornamental extruded thermoplastic material.

Another object of this invention is the provision of a new and improved process and apparatus for the production of ornamental extruded materials.

Other objects of this invention will be apparent from the following detailed description and claims.

According to this invention, a new ornamental extruded material is produced by forcing a stream of thermoplastic material in a highly plastic state under pressure through a passageway and injecting a different thermoplastic material into said stream at spaced points in said passageway. More particularly, the stream of highly plastic material is in the form of a moving sheet and the different thermoplastic material is injected intermittently at points which are spaced along the width of the sheet and at different depths in the sheet.

In the practice of this invention, it is desirable that the injected material have an appearance different from that of the material forming the stream. To this end we may employ a clear, transparent, water-white material, such as cellulose acetate, as the material of the stream and inject therein a dark-colored material, preferably having the same base, such as cellulose acetate containing brown pigment. However, the injected material need not have the same base as the material of the stream; for example, we may employ a clear cellulose acetate composition as the material of the stream and inject therein a colored cellulose butyrate or polyvinyl resin composition. In any case, it is preferred that the two materials be such as will form a firm bond when extruded together at elevated temperatures in a highly plastic state. The injected material may differ from the material of the stream in other respects; for example, it may differ with regard to its index of refraction or its opacity instead of or in addition to differing in color. Also, the injected material may be lighter in color, or even colorless, while the material of the stream may be darker in color.

Among the thermoplastic materials which may be employed in the practice of this invention are cellulose esters, such as cellulose acetate, cellulose propionate, cellulose butyrate, cellulose nitrate, cellulose acetate-butyrate or cellulose acetate-propionate; cellulose ethers such as ethyl cellulose or benzyl cellulose; extrudable polyamides such as nylon; polyesters such as polyethylene adipate or polyethylene terphthalate; resinous vinylidene polymers, such as polymers of methyl methacrylate or ethyl methacrylate, polystyrene, polyvinyl chloride, polyvinyl acetate, copolymers of vinyl acetate and vinyl chloride and polymers and copolymers of vinylidene chloride.

The ornamental material produced by the process of this invention generally comprises an extruded body of thermoplastic material having a plurality of relatively large distinct flattened bodies of a thermoplastic material of different characteristics positioned therein. More particularly, the extruded sheet may be made up of a transparent material and the injected material may be in the form of darker colored bodies lying parallel to the surfaces of the sheet and spaced along the length, the width and the thickness of the sheet. Preferably, the sheet ranges in thickness from about 10 mils to 500 mils and the width of each separate body ranges from about ⅛ inch to ¾ inch, while the thickness of each body is appreciably less than the thickness of the sheet, desirably about 30% to 80% of the thickness of the sheet. However, by increasing the pressure at which the darker colored material is injected it is possible to produce a sheet in which some or all of the injected bodies extend the entire thickness of the sheet.

The apparatus of this invention comprises means providing a passageway for receiving and forming a stream of thermoplastic material in highly plastic condition into a desired shape, means for forcing under pressure said stream of thermoplastic material through said passageway and means for injecting different thermoplastic material into said stream at spaced points in said passageway. More particularly, the apparatus includes a block which comes in contact with the stream of thermoplastic material in the passageway, the block being provided with a plurality of injection passages terminating at spaced points located at different levels in said passageway. Within the block is a movable tubular sleeve having apertures for connecting the interior of the sleeve with the injection passages. The different thermoplastic material is supplied to the interior of the sleeve under pressure and the sleeve is moved so as to place each of its apertures successively into and out of alignment with an injection passage. Preferably, the sleeve is rotatable and is so constructed that the movement of its apertures into and out of alignment with the injection passages is effected by the rotation of the sleeve. However, we may also employ other constructions, in which, for example, the sleeve has an axial, reciprocating motion or a combined axial and rotary motion. When an aperture in the sleeve is aligned with an injection passage the different thermoplastic material flows under pressure into said injection passage. During operation the injection passages become substantially filled with said different material so that when an aperture in the sleeve is again aligned with an injection passage, the flow of material under pressure from inside the sleeve pushes some or all of the material already in said injection passage out into the main stream of thermoplastic material to form an injected body in said stream. The shapes and sizes of the injected bodies may be altered by varying such factors as the sizes of the apertures, the speed of rotation of the sleeve, the pressure in the sleeve and the speed of the main stream. The apertures in the sleeve may be in the form of round holes or slots, or both round holes and slots may be present in the same sleeve.

In the drawing wherein a preferred embodiment of this invention is shown,

Fig. 1 is an elevational view, in cross section, of the extruding apparatus of this invention, Fig. 2 is a cross-sectional view along the line 2—2 of Fig. 1, Fig. 3 is an enlarged cross-sectional view of a portion of Fig. 2, and Fig. 4 is a view of an ornamental sheet material of this invention.

Like reference characters indicate like parts throughout the several views of the drawing.

Referring now to the drawing for a detailed description of this invention, reference numeral 11 designates a driven extrusion screw, of conventional construction, mounted in a cylinder 12 provided with a hopper 13 and with a heating element 14. Comminuted thermoplastic material, in the form of flakes, granules or powder, is fed continuously into the hopper 13 and is forced by the screw 11 through the heated cylinder 12. The thermoplastic material, in a heated highly plastic or molten condition, emerges from the cylinder 12 at a generally uniform rate and then travels under pressure through a passageway 16 formed in a die 17, through a passageway 18 formed by an injection block 19 and a base block 21, and finally through a passageway 22 formed in an outer die 23. The heated highly plastic material under pressure fills the passageways 16, 18 and 22, which are aligned and shaped, as shown in Fig. 2, so that the stream of thermoplastic material therein is in sheet form and maintained in this form. It is desirable to supply heat to dies 17 and 23 and blocks 19 and 21, as by means of conventional strip heaters (not shown), and to cool rapidly the highly plastic sheet emerging from the outer die 23.

The injection block 19 is provided with a plurality of cylindrical injection passages 24 terminating in tubular injection tips 26, which tips are attached to the block in any suitable manner. The outer ends of some of the tips 26 are flush with the walls of the passageway 18 while other tips extend for varying distances into said passageway. The injection passages 24, in the operation of the apparatus of this invention, received material which is different in composition, color or other characteristic from that of the material passing through the die 17. This different material is supplied by means of an extrusion screw 27 operating in a cylinder block 28 provided with heating means 29, a feed hopper 30 and a flanged heated coupling 31, said coupling being attached to the injection block 19 in alignment with the open end of a tubular sleeve 32 mounted for rotation in a cylindrical bore 33 in the block 19. Secured to the other end of the sleeve 32, and closing said end, is a shaft 34 on which a pulley 35 is keyed, said pulley being adapted to be driven in any suitable manner so as to rotate said shaft and sleeve. It is to be understood that any other suitable means, such as gearing, may be provided for rotating the shaft 34. The sleeve 32 is provided with a plurality of arcuate apertures 36, adapted to be aligned with the injection passages 24 during the rotation of the sleeve. It is apparent that during each rotation of the sleeve 32 the apertures 36 will serve to connect each passage 24 for only part of the time with the hot, highly plastic or molten material under pressure in said sleeve so that this material will be injected intermittently into the main stream of material moving from the die 17 past the tips 26. Since the apertures 36 are staggered around the circumference of the sleeve 32, these injections take place at different times during the rotation of the sleeve. Because the tips 26 are located at different levels with respect to the passageway 18, the injections of material are made at different levels in the main stream of material. Thus, as is shown in Fig. 4, a very interesting ornamental effect is produced in the finished sheet, in which the main body 38 of the sheet is made of a rigid, light-colored or colorless transparent material having spaced discrete masses 39 of darker colored rigid material distributed therethrough at different levels. These distributed masses 39 are of tear drop shape when viewed from above the sheet, are elongaged in the direction of extrusion of the main sheet, and are relatively thin and flat in cross-section.

It is to be understood that the foregoing detailed description is given merely by way of illustration and that many variations may be made therein without departing from the spirit of our invention.

Having described our invention, what we desire to secure by Letters Patent is:

1. An apparatus for the extrusion of thermoplastic materials, said apparatus comprising means providing a passageway, means for forcing a continuous stream of thermoplastic material in a highly plastic state through said passageway under pressure and means for injecting a different thermoplastic material under pressure into said stream at fixed points spaced laterally along the width of said stream and within said continuous stream, said means projecting for different depths into said stream so that the thermoplastic material injected into the continuous stream will be spaced different distances from the surface of the product obtained.

2. An apparatus for the extrusion of thermoplastic materials, said apparatus comprising means providing a passageway, means for forcing a continuous stream of thermoplastic material in a highly plastic state through said passageway under pressure and means for injecting a different thermoplastic material under pressure into said stream intermittently and sequentially at fixed spaced points in said passageway.

3. An apparatus for the extrusion of thermoplastic materials, said apparatus comprising means providing a passageway, means for forcing a continuous stream of thermoplastic material in a highly plastic state through said passageway under pressure and means for injecting a different thermoplastic material under pressure intermittently into said stream at fixed points spaced laterally along the width of said stream and within said continuous stream, said means projecting for different depths into said stream so that the thermoplastic material injected into the continuous stream will be spaced different distances from the surface of the product obtained.

4. An apparatus for the extrusion of thermoplastic materials, said apparatus comprising means providing a passageway adapted to maintain in sheet form a stream of highly plastic material under pressure, means for forcing a continuous stream of thermoplastic material in a highly plastic state through said passageway under pressure in sheet form and means for injecting a different thermoplastic material under pressure into said stream intermittently and sequentially at fixed points spaced laterally along the width of said stream and at different depths in said passageway and within said continuous stream.

5. An apparatus for the extrusion of thermoplastic materials, said apparatus comprising means providing a passageway, means for forcing a continuous stream of thermoplastic material in a highly plastic state under pressure through said passageway, means providing a chamber for a different thermoplastic material under pressure, means for supplying said different material under pressure to said chamber, means providing a plurality of injection passages terminating at points spaced laterally in said passageway, said means projecting for different depths into said stream so that the thermoplastic material injected into the continuous stream will be spaced different distances from the surface of the product obtained and means for connecting said chamber intermittently with said injection passages.

6. An apparatus for the extrusion of thermoplastic materials, said apparatus comprising means providing a passageway, means for forcing a continuous stream of thermoplastic material in a highly plastic state under pressure through said passageway, means providing a chamber for a different thermoplastic material under pressure, means for supplying said different material under pressure to said chamber, means providing a plurality of injection passages terminating at spaced points in said passageway, and means for connecting said chamber intermittently with said injection passages, said means being constructed and arranged to connect different injection passages with said chamber at different times.

7. An apparatus for the extrusion of thermoplastic materials, said apparatus comprising means providing a passageway, means for forcing a continuous stream of thermoplastic material in a highly plastic state through said passageway under pressure, means providing a plurality of injection passages terminating at spaced points in said passageway, an apertured rotatable sleeve adapted to receive a different thermoplastic material under pressure, means for rotating said sleeve, means for supplying said different material under pressure to said sleeve, the construction and arrangement being such that the apertures in said sleeve are intermittently aligned with said injection passages and each injection passage is intermittently connected with the thermoplastic material in said sleeve during the rotation of said sleeve.

8. An apparatus for the extrusion of thermoplastic materials, said apparatus comprising means providing a passageway, said means comprising a block having a plurality of injection passages terminating at spaced points in said passageway, means for forcing a continuous stream of thermoplastic material through said passageway and past said spaced points under pressure, a rotatable tubular sleeve within said block, said sleeve having apertures for connecting the interior of said sleeve with said injection passages, means for rotating said sleeve and means for supplying a different thermoplastic material under pressure to the interior of said sleeve.

9. An apparatus for the extrusion of thermoplastic materials, said apparatus comprising means providing a passageway adapted to maintain in sheet form a stream of highly plastic material under pressure, means for forcing a stream of thermoplastic material in a highly plastic state through said passageway under pressure in sheet form, means providing a plurality of injection passages terminating at points spaced laterally along the width of said passageway and at different depths in said passageway, an apertured rotatable sleeve adapted to receive a different thermoplastic material under pressure, means for rotating said sleeve, means for supplying said different material under pressure to said sleeve, the construction and arrangement being such that the apertures in said sleeve are intermittently aligned with said injection passages and each injection passage is intermittently connected with the thermoplastic material in said sleeve during the rotation of said sleeve.

10. In a process for extruding thermoplastic materials, the steps which comprise forcing a continuous stream of a thermoplastic material in a highly plastic state and under pressure through a passageway and injecting a different thermoplastic material into and within said stream at fixed points spaced laterally along the width of said stream, said points being at different depths in said stream so that the thermoplastic material injected into the continuous stream will be spaced different distances from the surface of the product obtained.

11. In a process for extruding thermoplastic materials, the steps which comprise forcing a continuous stream of a thermoplastic material in a highly plastic state and under pressure through a passageway and injecting a different thermoplastic material under pressure intermittently into said stream at fixed spaced points in said passageway said injections being made at different spaced points at different times.

12. In a process for extruding thermoplastic materials, the steps which comprise forcing a continuous stream of a thermoplastic material in a highly plastic state and under pressure through a passageway and injecting a different thermoplastic material under pressure intermittently into and within said stream at fixed points spaced laterally along the width of said stream and at different depths in said stream.

13. In a process for extruding thermoplastic materials, the steps which comprise forcing a continuous stream of a thermoplastic material in a highly plastic state in sheet form and under pressure through a passageway and injecting a different thermoplastic material in a highly plastic state, under pressure, intermittently into said stream at fixed points spaced laterally along the width of said stream and at different depths in said stream, said injections being made at different spaced points at different times.

References Cited in the file of this patent

UNITED STATES PATENTS

| Number | Name | Date |
|---|---|---|
| 817,080 | Mahoney | Apr. 3, 1906 |
| 1,428,381 | Lower | Sept. 5, 1922 |
| 2,138,378 | Johnson | Nov. 29, 1938 |
| 2,174,779 | Delorme | Oct. 3, 1939 |
| 2,261,977 | Deutsch | Nov. 11, 1941 |
| 2,558,791 | Smith et al. | July 3, 1951 |
| 2,632,204 | Murray | Mar. 24, 1953 |